United States Patent [19]
Kimura

[11] 4,236,334
[45] Dec. 2, 1980

[54] ROTARY TYPE INFORMATION RETRIEVING MACHINE

[75] Inventor: Yoshimi Kimura, Nagareyama, Japan

[73] Assignee: Kabushiki Kaisha Fuji Seisakusho, Nagareyama, Japan

[21] Appl. No.: 939,976

[22] Filed: Sep. 6, 1978

[30] Foreign Application Priority Data

Sep. 8, 1977 [JP] Japan .................................. 52/108044

[51] Int. Cl.³ ............................................. B42F 17/34
[52] U.S. Cl. ....................................... 40/378; 40/466; 40/475; 40/510; 40/532
[58] Field of Search ................. 40/378, 377, 380, 466, 40/467, 447, 475, 510, 526, 531, 532; 340/806–809; 178/28, 29, 32, 34, 35, 38, 40, 41

[56] References Cited

U.S. PATENT DOCUMENTS

| | | | |
|---|---|---|---|
| 667,865 | 2/1901 | Brown | 40/379 |
| 1,477,887 | 12/1923 | McDonald | 40/475 |
| 1,914,597 | 6/1933 | Dobrowsky | 40/475 |
| 1,978,556 | 10/1934 | Stürner | 40/466 |
| 3,279,108 | 10/1966 | Capellari | 40/475 |
| 3,490,160 | 1/1970 | Freidhoff et al. | 40/466 |
| 4,060,919 | 12/1977 | Sasaki | 40/532 X |

FOREIGN PATENT DOCUMENTS

27793  4/1913  United Kingdom ...................... 40/467

*Primary Examiner*—John F. Pitrelli
*Assistant Examiner*—G. Lee Skillington
*Attorney, Agent, or Firm*—Polster, Polster and Lucchesi

[57] ABSTRACT

A rotary type index in which a multiplicity of information containing cards are arranged around a cylindrical drum and the drum is rotated to display information-containing surfaces of the cards in a viewing window is provided with a mechanism for causing a plurality of the information cards to be brought into position with a single selection key. This is as distinguished from the conventional drum type machine in which the number of selection switches equals the number of information cards.

1 Claim, 17 Drawing Figures

ROTARY TYPE INFORMATION RETRIEVING MACHINE

BACKGROUND OF THE INVENTION

This invention relates to a rotary type information retrieving machine, in which a multitude of information-containing cards are arranged in a designated sequence around a rotational body such as a cylindrical drum with one side of each information card being pivotally fitted thereon, and the rotational body is rotated in a definite direction to display the information-containing surfaces of the cards as selected in a viewing window of the retrieving machine.

This kind of device is provided with selection switches equal in number to the information cards, by the selection of which any one of the information cards is brought to the viewing window. Therefore, the selection key, the selection switch associated with the selection key, and the information card exactly correspond to each other in number.

However, with increase in the amount of information to be stored in the information cards, it becomes difficult to accommodate all the information cards as desired in a very limited space of the retrieving machine, maintaining the above-mentioned one-to-one relationship between the card and the selection key. Accordingly, it is necessary to cause a plurality of such information cards to be changed with a single selection key so that a greater number of cards may be accommodated in the retrieving machine.

SUMMARY OF THE INVENTION

In view of the above, it is an object of the present invention to provide an information retrieving apparatus of a type, in which the number of the information cards is increased by n times an integer with respect to the number of the selection switches and the number of the selection switches is inversely decreased to 1/n the number of the information cards.

It is another object of the present invention to provide an information retrieving apparatus capable of bringing into view the surfaces of the information cards which contain therein various useful informations such, for example, "answers" to "questions" in a self-study card, or "buying-in" and "customer" in commercial transaction, and so forth, thereby broadening utility of this kind of information retrieving apparatus.

According to the present invention, briefly stated, there is provided an information retrieving apparatus of a rotary type which comprises in combination a rotary member, a plurality of information cards arranged in any designated sequence and mounted on the rotary member, driving means to rotate the rotary member and the information cards, and switch means to select a rotational angle to regulate rotation of the driving means so as to bring any one of the information cards as selected into view in the retrieving machine, the regulated rotational angle of the driving means being changed by changing a corresponding relationship between a movable side and a fixed side of the rotational angle selection switch so that one angular change may apply to the information cards in number corresponding to integral multiples of the change in corresponding position of the rotational angle selection switch.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purpose of illustration and description, and are shown in the accompanying drawings, forming a part of the specification, in which:

FIGS. 8 through 13 show various embodiments of changing the rotary contact.

DETAILED DESCRIPTION OF PREFERRED EMBODIMENTS

In the following, preferred embodiments of the present invention will be described in detail in reference to the accompanying drawing.

Referring first to FIGS. 1 to 5, a reference numeral 1 designates a main body casing of the information retrieving apparatus, a numeral 2 refers to a display or card reading window formed in the front upper part of the main body casing 1, a reference numeral 3 designates a transparent cover fitted in the display window 2, a reference symbol M designates a drive motor for the rotational body, a numeral 6 refers to a speed reduction mechanism between the drive motor M and the rotary member 4, 7A to 7O are push button keys arranged in a panel board at the lower front face of the main body casing 1, the keys being associated with a well known self-sustaining type key board switch mechanism (for details, see laid-open Japanese Utility Model Application No. 49-121431 ) omitted from illustration in the main body casing, a reference numeral 9 designates fixed contacts for the rotational angle selection switch, a numeral 10 designates a movable (or rotary) contact being rotatably mounted on a shaft 11 relative to the fixed contact, the movable contact rotating with the rotary member 4.

Figure 1:
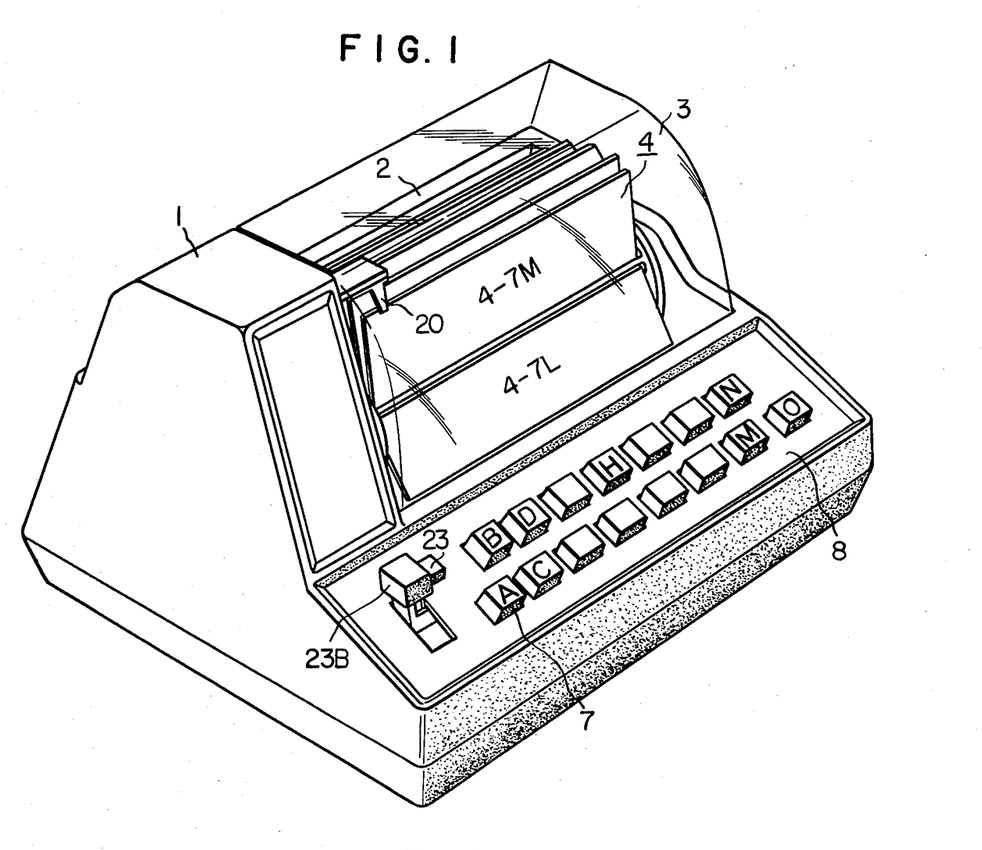
FIG. 1 is a perspective view showing one embodiment of the rotary type information retrieving apparatus according to the present invention.
Figure 2:
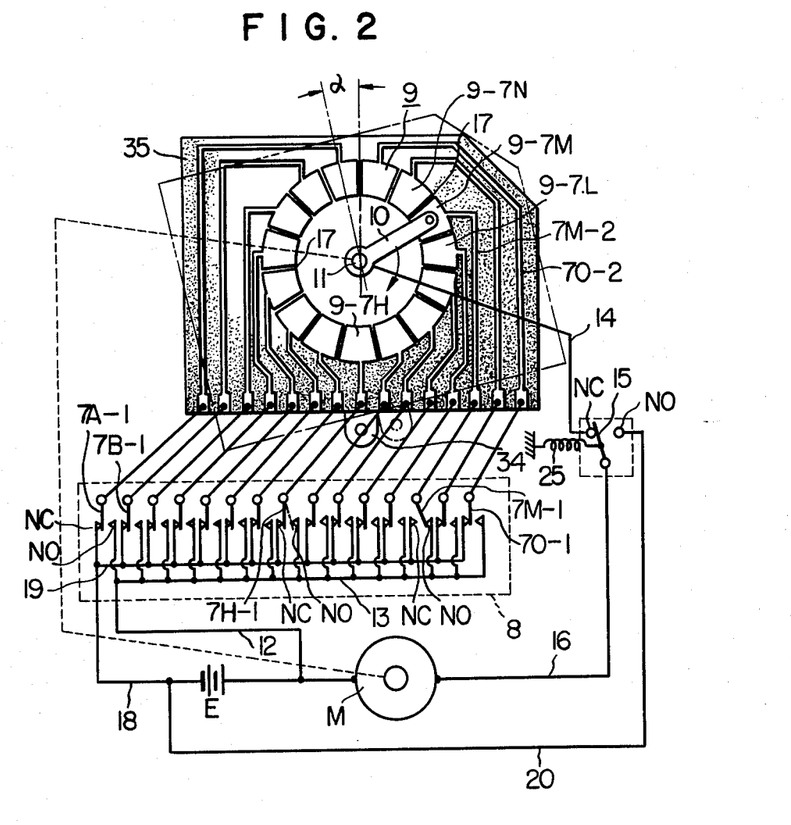
FIG. 2 is a schematic control circuit diagram of the apparatus shown in FIG. 1.
Figure 2:
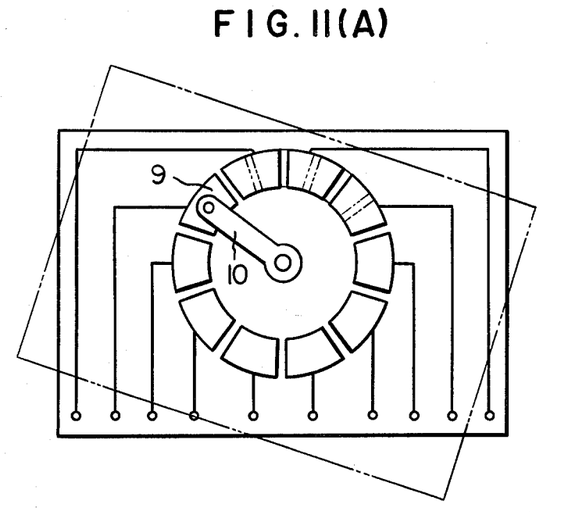

In the illustrated example of the control electrical circuit in FIG. 2, a push button 7M is depressed and a switching element 7M-1 interlocked with the push button 7M is changed over from a constantly closed switching element 7M-NC to another constantly open switching element 7M-NO, both corresponding to the switching element 7M-1. In this state of the switching connection, the motor M drives to close a braking electric path through a circuit consisting of a conductor wire 12, a conductor wire 13 common to all the contact switches, the switching elements (7M-1, NO), a printed circuit (7M-2), one of the fixed contacts (9-7M), the movable contact 10, the conductor wire 14, a change-over switch (15-NC), a conductor wire 16, the motor M, whereby the counter electromotive force performs a braking function to cause the movable contact 10 to stop at the position of the fixed contact 9-7M. In this consequence, the rotary member 4 naturally stops, and one surface of the information card 4-7M corresponding to the selection push botton 7M appears in the display window 2. Depending on the size of the display window 2 and arrangement of the information cards, not only the front surface of the card 4-7L preceding the card 4-7M, but also its back surface can be shown simultaneously with the front surface of the card 4-7M. Incidentally, a reference numeral 17 designates an insulation between the adjacent contacts 9, 9.

The contacts NC of the switching elements 7A through 7O except for the circuit composed of a power source E, a conductor wire 18, a common conductor wire 19, the switching element 7M are in a closed state as shown in the drawing. However, as the movable contact 10 is stopped at the position of the fixed contact 9-7M in the rotational angle selection switch 9, the power source circuit E of the motor M is open. About a conductor wire 20, explanation will be made at a later paragraph.

When the selection push button 7H is depressed, the abovementioned switching element 7M-1 changes its contact from NO to NC, and the switching element 7H-1 from NC to NO. As the result, the motor circuit is closed in the routing of the power source E, the motor M, the conductor wire 16, the change-over switch (15-NC), the conductor wire 14, the movable contact 10, the fixed contact (9-7M), the printed circuit (7M-2), the switching element (7M-1, NC), the common conductor wire 19, the conductor wire 18, the power source E, whereby the motor M starts rotation to cause the rotary member 4 and the movable contact 10 to move to the rightward direction in this illustrated embodiment. By contacting the movable contact 10 with the subsequent position of 9-7N of the fixed contact 9, the circuit functions sequentially in a similar manner as mentioned above so as to maintain the closed condition of the motor circuit through the switching elements 7N-1, NC, whereby the motor M continues its rotation.

The information card 4-7M is pivotally supported at its lower edge on one of card fitting pins 22 provided on the peripheral part of a circular disc 21 mounted on the shaft 11 of the rotary member 4, while it is restricted its pivotal movement at its upper edge by a stopper pawl 20. As the rotary member 4 rotates in the arrow direction in FIGS. 2 and 3, the information card 4-7M is released from restriction by the stopper pawl 20 and falls down in the forward direction with the pin 22 as the center of its rotation. Subsequent information cards contact one by one the stopper pawl 20 in this manner, while the rotary member 4 is rotating. When the movable contact 10 moves to the fixed contact 9-7H, the power source circuit E of the motor M opens, since the contact NC of the switching element 7H-1 is in an open state. On the other hand, the abovementioned braking circuit consisting of the motor M, the conductor wire 12, the common conductor wire 13, the switching element (7H-1, NO), the fixed contact (9-7H), the movable contact 10, the conductor wire 14, the change-over switch (15-NC), the conductor wire 16, the motor M is closed, and the motor M and the rotary member 4 are immediately stopped by the counter electromotive force due to the inertial rotation of the motor M, whereby the card 4-7H appears in the display window 2.

The above-described construction is disclosed in the laid-open Japanese Utility Model application No. 52-19312 of the same inventor in his prior application. In this case, the information card and the card selection switch, i.e., rotational angle regulating switch (push buttons 7A through 7O, contacts NO and NC of the switching element 7A-1 to 7O-1, fixed contacts 9-7A to 9-7O) are in the same number.

The present invention is to solve the afore-described problem by changing the correspondence between the movable contact 10 of the rotational angle selection switch and the fixed contacts 9.

Figure 6:
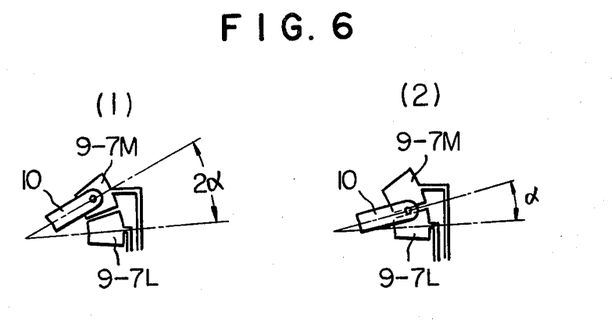
FIG. 6 is an explanatory diagram of changing the rotational angle.

In the above-described embodiment, 15 push buttons 7A to 7O and the fixed contacts 9 are used. Accordingly, the distribution angle of the fixed contacts 9 is 24° degrees (360°/15). The correspondence between the movable contact 10 and the fixed contacts 9 is changed by rotating in the leftward direction the fixed contact panel 35 by α degree (e.g. 12°=24°/2). That is to say, the state in FIG. 6(1) is changed to the state of FIG. 6(2) by a changing knob 23. On the other hand, 30 sheets of the information cards are mounted on the pins provided on the disc 21 with an angular interval of 12°.

When the change-over switch 15 is changed over to the contact NO in association with the abovementioned change-over operation, a circuit consisting of the power source, the motor M, the conductor wire 16, the change-over switch (15-NO), the stopper pawl 20, the power source E is closed, and the motor M rotates the movable contact 10. The contact 10 moves to the subsequent position 9-7N of the contacts 9 to close the circuit consisting of the movable contact 10, the fixed contact (9-7N), the switching element (7N-1, NC) to continue rotation of the motor M and the rotary member 4, hence the movable contact 10 in the manner as described in the foregoing along with restoration of the change-over switch 15 to the contact NC.

Since the selection push button remains on 7H, the switching element 7H-1, NO is closed. When the movable contact 10 contacts with the fixed contact 9-7H, the abovementioned operations stop entirely. At this time, the fixed contact 9-7H is displaced by 12° (α) in the direction opposite to the rotational direction of the movable contact 10, so that the rotational angle of the rotary member 4 is smaller by 12 degrees than in the previous case. Accordingly, the card 4-7H2, positioned 12 degrees in the rotational direction of the circular disc 21 preceding the information card 4-7H, appears in the display window 2.

In more detail, by providing double cards 4-7A2, 4-7B2 . . . positioned between each of the preceding information cards 4-7A-4-7B disposed by 24 degrees as in the well known technique, and by providing regulating rotational angle changing means 23, 15, it is possible to bring into view, for example, the corresponding double card 4-7H2 (e.g., for answer), when the changing knob 23 is manipulated with the push button 7H, being, as it is, after the corresponding card 4-7H (e.g., for question) is brought into view by depression of the selection button 7H.

Figure 3:
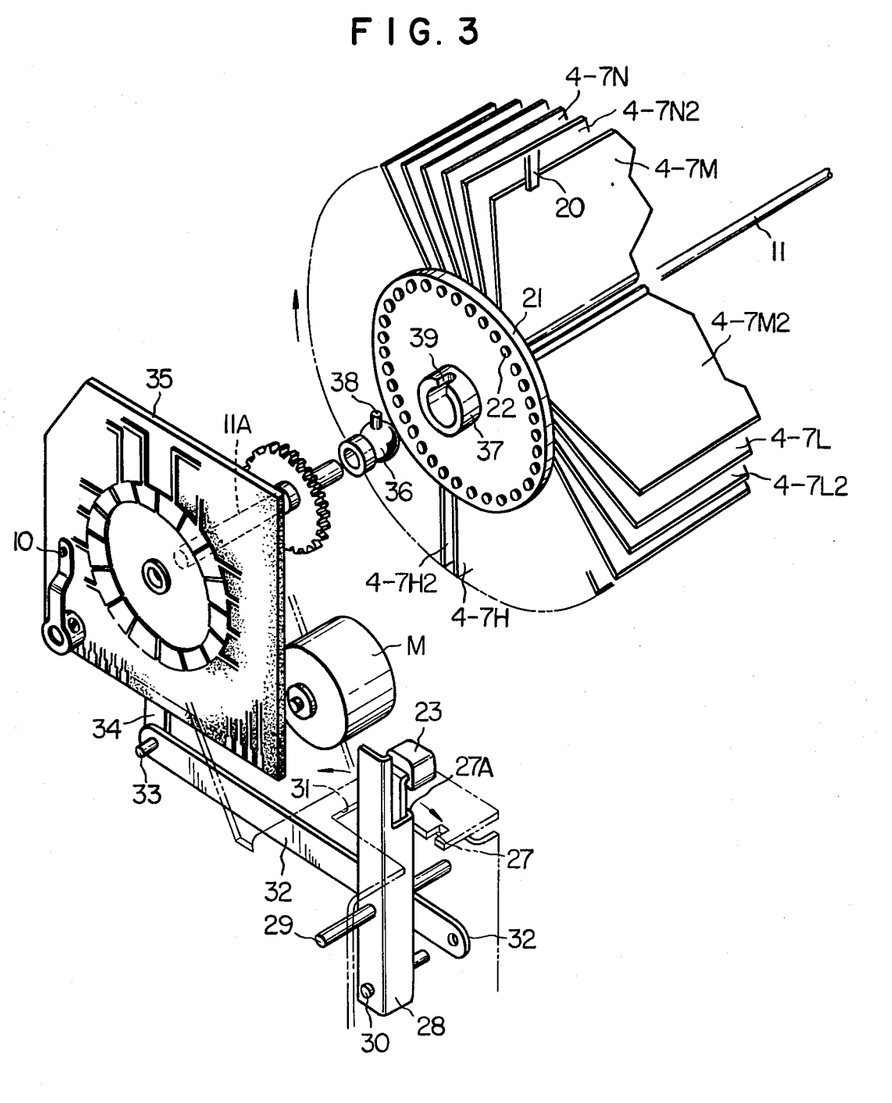
FIG. 3 is an exploded perspective view of a part of the internal mechanism of the apparatus in FIG. 1.
Figure 4:
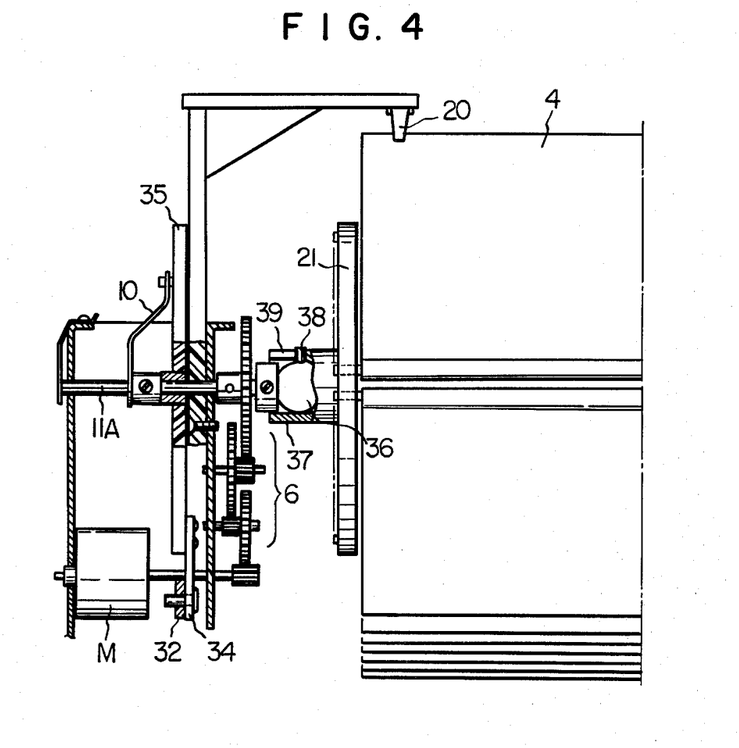
FIG. 4 is a front view, partly cut away, of the power transmission mechanism of the apparatus in FIG. 1.
Figure 5:
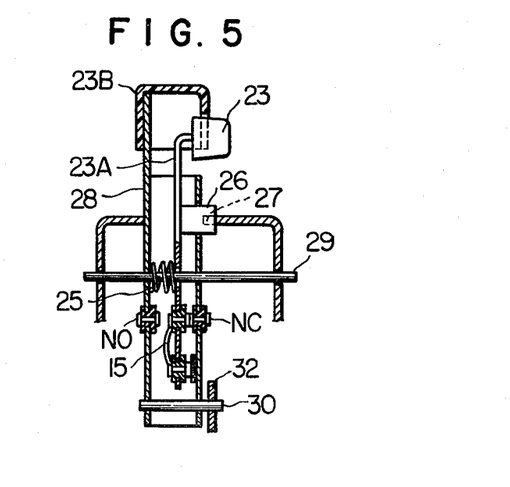
FIG. 5 is a front view, in longitudinal cross section, of a regulated rotational angle changing mechanism.

The changing means may be such one as shown in FIGS. 3 to 5, in which, when the changing knob 23 and a lever 23A integral therewith are depressed against a spring 25 to disengage a projection 26 from a recess 27, the change-over switch 15 is changed from the constantly closed contact NC over to the constantly open contact NO. When the changing knob 23 is rotated leftward in FIG. 3 together with a holder 28 until the holder 28 comes into contact with the stop 31, a link 32 connected with the holder 28 by a pin 30 causes the printed circuit board 35 of the wirings 7A-2 to 7O-2 and the fixed contacts 9 to rotate counter-clockwise by 12° with the shaft 11A of the rotary member 4 through pivot shaft 33 and link 34. At this position, when the projection 26 of the changing knob 23 is engaged with the recess 27A, the change-over switch 15 closes the contact NC.

FIG. 4 illustrates a construction, in which the shaft of the rotary member 4 is divided into the shaft 11A, at the side of the motor, and the the shaft 11 at the side of the cards. Both motor side shaft 11A and card side shaft 11 are joined together by fitting a spherical member 36 at the tip end of the motor side shaft 11A into a cylindrical member 37 at the tip end of the card side shaft 11 so that a projected pin 38 of the spherical member 36 may be snuggly fitted into a slot 39 formed in one part of the cylindrical member 37. To disengage the spherical member 36 and the projected pin 38 from the cylindrical member 37 and the slot 39, the shaft 11 is pulled rightward in the drawing against a pushing spring provided at a bearing portion on the opposite side of the rotary member 4, thereby connecting and disconnecting the rotary member 4 to and from the power transmission mechanism.

The illustrated embodiment uses the constantly closed contact NC and the constantly open contact NO as mentioned above as the switching elements interlocked with the push buttons 7A to 7O. Such switching element may also be of such a construction that, as described in the laid open Japanese Utility Model application No. 49-121431, any selected element is opened with a single piece of the constantly closed contact, and the power source circuit and the braking circuit of the motor M is changed over by the use of a relay switch.

Figure 7:
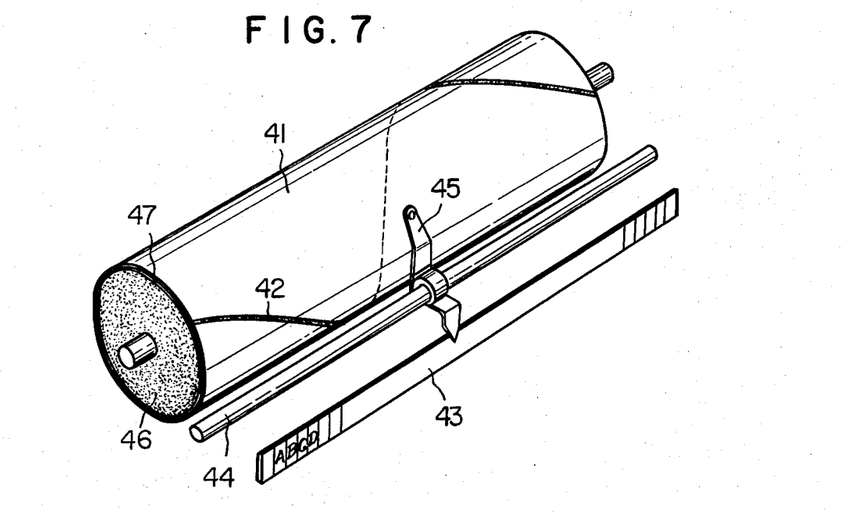
FIG. 7 is a modification of the rotational angle selection switch.

FIG. 7 shows a selection switch consisting of a cylindrical contact member which rotates at the same speed as the rotary member 4 for the information card and is provided on the outer peripheral surface of a cylindrical conductive member 41 with a single spiral insulative section 42 with the total length of the cylindrical conductive member as one pitch and a contact member 45 which moves along a lever 44 in accordance with retrieving symbols 43 such as, for example, A, B, C, etc. By displacing the cylindrical conductive member 41 in the circumferential direction with respect to a supporting cylinder 46 against a frictionally engaged spring 47 by means of the regulating rotational angle changing knob 23, the present invention is applicable to a construction in which this rotational angle selection switch is utilized.

In the same manner, the present invention is applicable to a construction wherein a planar, spiral-shaped rotational angle selecting switch, which is provided with an insulative section in a spiral shape around the surface of the rotary disc-shaped conductor member, and in which the contact member, shifted in the radial direction of the circular disc, is utilized. Incidentally, the circuit construction, when these switching devices are used, is well known from the Japanese Utility Model publication No. 50-44798, and others.

Figure 8A:
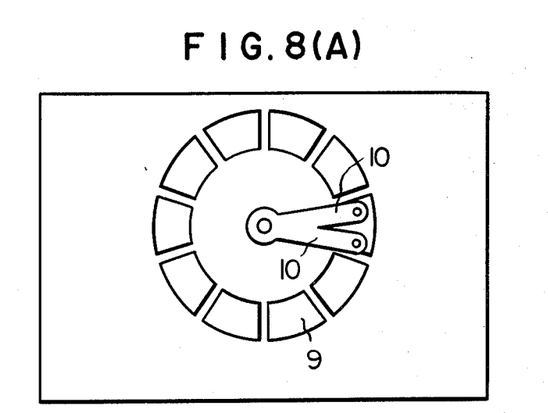
Figure 8B:
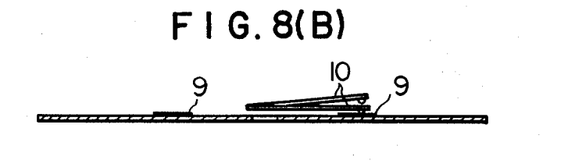
Figure 9:
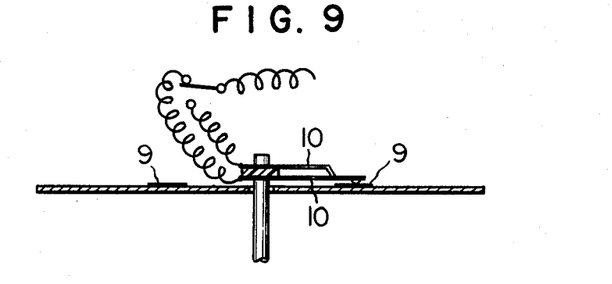
Figure 10:
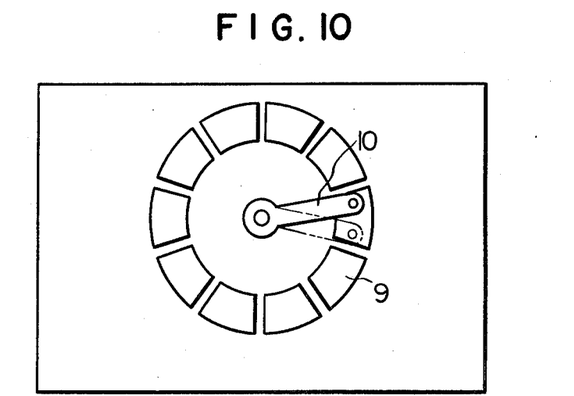
Figure 12A:
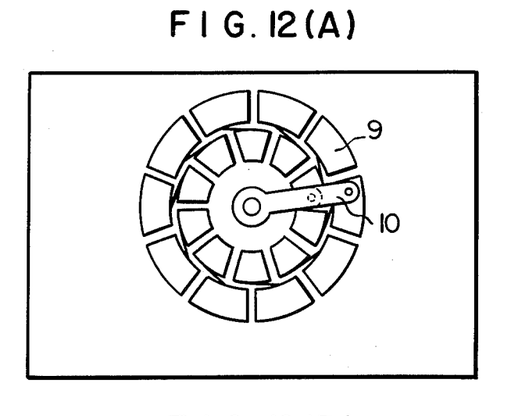
Figure 12B:
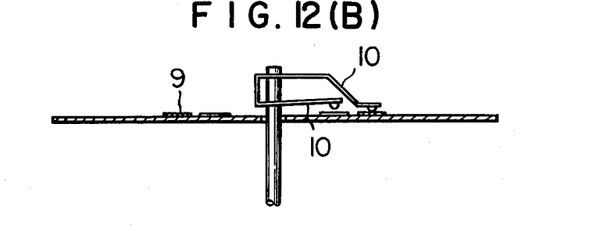
Figure 13A:
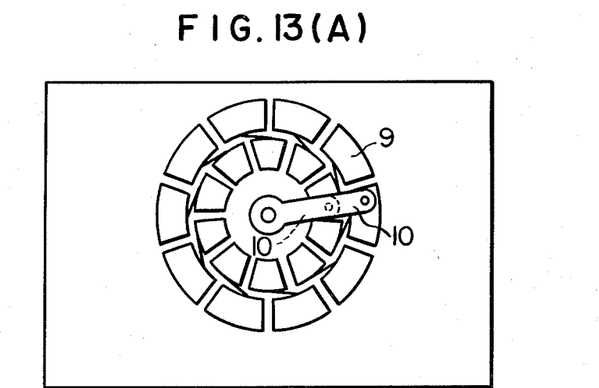
Figure 13B:
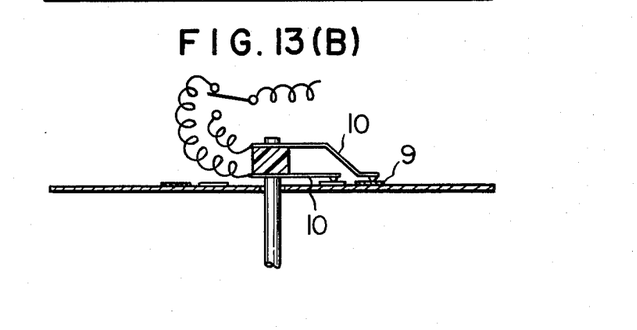

FIGS. 8 to 13 show various embodiments of how the movable contact 10 is caused to contact the fixed contacts 9. Briefly, FIG. 8 indicates that the movable (or rotary) contact mechanically changes its contact with the fixed contacts 9 by increasing the number of such fixed contacts corresponding to the number of changing angle of the rotary contact 10. FIG. 9 indicates that the change in the rotary contact in FIG. 8 is done electrically through a switching element. FIG. 10 shows that the movable contact is moved for the amount of the angular change by manually turning a knob. FIG. 11 illustrates that the printed circuit board, on which the fixed contacts are provided, is moved to change the position with respect to the movable contact. FIG. 12 shows that the contact of the movable contact to the fixed contacts is mechanically changed by printing the fixed contact on the board for the number corresponding to the angular changes, and the necessary contact is chosen by the movable contact. FIG. 13 shows that the above-mentioned contact change in FIG. 12 is effected electrically by means of an electrical switching element.

As mentioned, the construction according to the present invention makes it possible to store and to retrieve two to three times as many information cards as there are retrieving symbols, by providing the regulated rotational change of the contact in two or three stages.

It is also possible that the abovementioned information cards are mounted on an endless belt rotary member, or they may be held in a card accommodating case.

What is claimed is:

1. In a rotary type information retrieving machine having a rotary shaft; a plurality of information cards arranged in any designated sequence and hangingly supported around said rotary shaft; a rotating motor for transmitting rotational force to said rotary shaft; a plurality of information retrieving keys corresponding in number to said information cards, said keys being arranged regularly on a key board; a rotational angle selection switch comprising a panel of fixed contacts and a movable contact rotating in asssociation with said rotary member and information cards; and a gear train provided to transmit rotational force from said motor to said rotary shaft, the improvement comprising: a rotational angle changing mechanism for said rotational angle selection switch constructed with:

a manipulating lever (23A) which is swingably supported on a shaft (29);

a contact (15) provided at one end part of said lever (23A) in constant contact with a normally closed contact (NC) by a spring (25);

a holder (28) enclosing said lever (23A) and pivoted for pivotal movement at a pivotal point (30) thereof together with said lever (23A);

a projection (27) provided on one part of said lever (23A) to be engaged with and disengaged from recesses (27) to secure a position of said holder (28) and lever (23A) as displaced;

stop means (31) to restrict swinging motion of said holder (28);

a linking member (32) connected at one end thereof with said pivotal point (30) for said holder; and another linking member (34) connected at one end thereof with the other end of said linking member (32) through a pivotal point (33) thereof, and, at the other end thereof, with said fixed contacts panel (35) which is oscillatably supported on a shaft (11A) for said rotary member, said fixed contacts panel (35) being angularly displaced around said shaft (11A) by depressing said lever (23A) against force of the spring (25) to disengage the projection (26) from one of the recesses (27) to change the contact (15) on said lever (23A) contacted with said normally closed contact (NC) over to a normally open contact (NO), then oscillating said lever (23A) together with said holder (28) until said holder comes in contact with said stop (31), at which said projection (26) is engaged with the other recess (27), whereby said fixed contacts panel (35) is caused to displace at a predetermined angle due to interlocked motion of said linking members (32, 34) along with the oscillating motion of said lever (23A).

* * * * *

UNITED STATES PATENT AND TRADEMARK OFFICE
CERTIFICATE OF CORRECTION

PATENT NO. : 4,236,334
DATED : December 2, 1980
INVENTOR(S) : Yoshimi Kimura

It is certified that error appears in the above-identified patent and that said Letters Patent are hereby corrected as shown below:

In Claim 1, column 6, line 61, cancel "projection (27)" and insert ---projection (26)---.

Signed and Sealed this

Seventeenth Day of March 1981

[SEAL]

Attest:

RENE D. TEGTMEYER

Attesting Officer  Acting Commissioner of Patents and Trademarks